Oct. 7, 1930.  C. F. J. CHARLISS  1,777,428
STEAM TURBINE
Filed Nov. 25, 1927
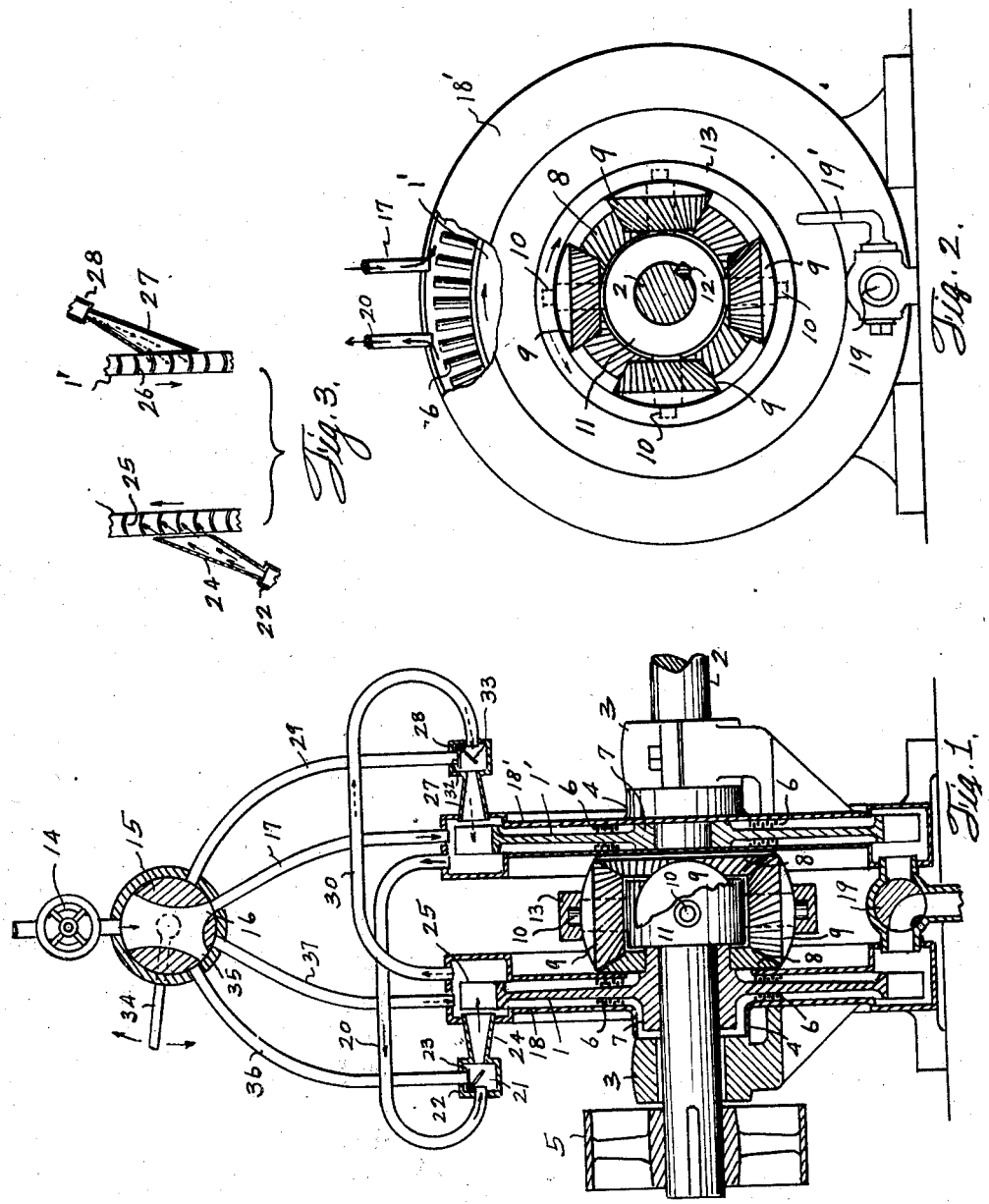
Inventor
Charles F. J. Charliss
By Hardway Cathey
Attorneys Patented Oct. 7, 1930

1,777,428

UNITED STATES PATENT OFFICE

CHARLES F. J. CHARLISS, OF HOUSTON, TEXAS

STEAM TURBINE

Application filed November 25, 1927. Serial No. 235,646.

This invention relates to new and useful improvements in a steam turbine.

The invention has for its object the conversion of the high, constant speed of steam turbines by means of integral gearing into the low, variable, reversible speed required for driving locomotives, ships, cars and trucks, rolling mills, hoists, etc. or into low, constant speed required by other machinery.

It is well-known that the steam turbine is inherently a constant speed, irreversible motor, which works most efficiently at some particular high speed, the higher the more efficient and the more power delivered for a given size and weight of turbine. Most machinery to be driven however, runs at comparatively low speed so that to drive it with turbines, their speed is reduced by constructing them to use the steam in stages through several rotors successively. This has the disadvantage of increasing their size and weight for a given power. For a great deal of machinery their speed even when staged is still too great, so that further reduction in speed must be secured either through cumbersome and costly speed reducers or by a generator-motor electric reduction which is even more cumbersome and costly with additional losses in efficiency.

The advantages of the high-speed turbine in space-saving, lightness and higher efficiency, are thus largely lost through these expedients for securing low speed from an inherently high-speed prime-mover. As for variable and reversible low speed, the turbine has heretofore been considered as not adaptable to such service except through the roundabout means of the electric combination reduction above-noted.

In the present invention any low speed may be obtained from the highest possible speed, as that from a single-stage impulse turbine for example. Or the same principles may be applied to the slower moving staged types of turbines to obtain low speed. The low speed may be constant and reversible or it may be variable and reversible through any required range of velocity from a fraction of a revolution per minute to several hundred or more with constant high-speed of the driving rotor or rotors within usual governing limits.

In the mechanical speed-reductions mentioned above, there is a fixed ratio between the high and low speeds, as for instance, 4:1, 10:1, or in ships sometimes 35:1, etc.

In the present invention instead of being thus fixed, the ratio varies, being greatest at starting—giving high starting torque—and lessening as the low-speed shaft gains speed.

Fixed ratios require wide variations of high speed for small variations of low speed; 40, 100, and 350 revolutions respectively, being required with above ratios to vary the low speed only 10 revolutions. In the present invention, the exact opposite is the case, small variations of high speed resulting in wide variations of low speed; the 10 revolutions cited requiring but 20 in the high speed whether the high speed be 2000, or 20,000 or any other number of revolutions per minute.

These results are attained by gearing the low-speed shaft to high-speed rotors in a differential relationship as shown diagrammatically in the annexed drawings, wherein:—

Figure 1 is a side elevation, partly broken away and in section, showing two high-speed rotors adapted to revolve oppositely and freely around the low-speed central shaft to which they are connected through a differential arrangement of gearing. This figure also shows the steam connections from a throttle to the rotor, controlled by a five-way valve.

Figure 2 is an inner side elevation, partly broken away, showing the righthand rotor in its casing, and side view of the differential.

Figure 3 shows in top plan a portion of the blading of each rotor and a driving nozzle of each. Simple impulse rotors with axial-flow type blading and nozzles are shown in the three figures, but the tangential-flow type impulse rotors, may be used instead without affecting the basic principles of the invention. I do not confine myself to any particular type of rotor, nor to any particular number of nozzles.

Referring particularly to the drawings, like numerals of reference designate similar parts in each of the figures.

For highest efficiency and greatest economy of space and weight for a given power, it is preferable to use simple or single-stage impulse rotors because of their very high speeds. The slower but still high, constant speed of any of the staged types of turbines which permit of the necessary modification of structure may however, be converted in the same manner to low, constant or low, variable speed, both reversible.

The numerals 1, 1' designate the two rotors. Both rotors rotate freely around the central shaft 2, rotor 1 always in a forward direction and rotor 1' in reverse or backward direction, whether the shaft be driven by them forward or backward. The shaft 2 rotates in bearings 3 attached to rotor casing 4 and extends unbroken through the rotors 1, 1'. It may be direct-connected to the machinery to be driven, as to the end broken away or it may drive it through a belt running over a driving pulley 5 at the other end. Labyrinth packings 6 near rotor hubs 7 prevent escape of steam around the rotor hubs. Attached to hubs 7 are the bevel gears 8 which are in mesh with and drive the bevel pinions 9 continuously while steam is on the rotors, around the arms 10 of a spider whose hub 11 is attached by key 12 (Fig. 2) to the shaft 2. A rim 13 surrounds the pinions 9, the spider arms 10 extending into it, or the rim 13 may be connected more rigidly to its hub 11 by spokes between the pinions, if desired.

The rotors 1 and 1' are thus connected to shaft 2 symmetrically, rotor 1 being driven by the steam to impart forward motion to the shaft and rotor 1' for reversing the shaft. The steam-driven rotor drives the other through the gearing in each case. Fig. 3 shows that each rotor runs in its own direction only, but rotor 1 runs the faster for driving the shaft forwardly while for reversing the rotor 1' runs the faster, their functions interchanging.

Rotors 1 and 1' being connected to the shaft 2 equally through the differential gearing, if steam were applied to rotor 1, driving it forwardly, rotor 1' would be driven backwardly at equal speed through the gearing, with the shaft 2 at rest. But if a brake were applied to rotor 1' the shaft would begin to rotate in the direction of rotation of rotor 1 or forwardly and gain speed as the rotor 1' slowed down. At the moment rotor 1' were brought to a stop, the shaft would have been forced up to one-half the velocity of the rotor 1 since the spider attached to the shaft occupies a mid-position between the two equal gears 8 attached to the rotor hubs 7.

If conditions were reversed with steam driving rotor 1' backwardly, the rotor 1 would be driven forwardly through the gearing, by rotor 1', at equal speed with the shaft at rest. Applying a brake now to rotor 1 gradually until it stopped, shaft 2 would be forced or driven backwardly, gaining speed until it attained half the velocity of the rotor 1'.

Shaft 2 then, is driven at a velocity equal to one-half the difference of velocity of the rotors and in the direction of the faster moving rotor when they rotate at different speeds.

The cases cited are extreme and used only to illustrate the differential principle of operation of the invention, it being impractical to stop a rotor and to use mechanical brakes on them. It is clear however, that the principle of the speed reduction is applicable to many types of rotors, single or multi-staged, with any type of blades or buckets. In practice, full low speed of the shaft 2 should preferably be but a few per cent of normal operating speed of the driving rotor, the turbine being designed to that end.

While a mechanical brake may not be used, the rotor driven through the gearing may be forced to rotate through a dense gas, the frictions developed acting as a gaseous brake to retard the rotor the few per cent necessary to bring the shaft up to speed in the opposite direction.

High-pressure steam is a convenient dense gas for the purpose, the steam being used therefore, to retard one rotor as well as to drive the other. In the single-stage impulse type shown in Fig. 1, the action for forward motion of shaft 2 is as follows, full line arrows showing the direction of the steam and of the rotors:—

Steam admitted from the supply through throttle 14 passes through valve 15, its outlet 16, pipe 17, into casing 18' of the rotor 1' filling the casing with high-pressure steam, valve 19 preventing its escape through the exhaust. The steam passes then by way of the outlet pipe 20 through check-valve 21 into steam chest 22, closing the outlet check valve 23 and expanding in the driving nozzle 24, gains velocity in a well understood manner, entering the casing 18 of the rotor 1 and impinging on blades 25 sets the rotor 1 to revolving at high speed around shaft 2 in forward direction, the rotor 1 in turn driving the rotor 1' in reverse or backward direction through the gears 8, attached to their hubs, and the pinions 9.

The inertia of the connected load at rest tends to prevent the shaft 2 from turning. Therefore, since the gears 8 attached to the hubs are equal, the rotor 1' tends to revolve backwardly at the same speed as the rotor 1 rotates forwardly. But conditions now prevent it from doing so. The rotor 1 is being driven through steam at atmospheric pressure (or less if connected to a condenser) meeting little resistance to its motion whereas the rotor 1' meets with a great deal of resistance because it is being forced to move at high speed through a dense steam atmosphere, the high-pressure steam filling its casing being of high density. Said rotor 1' meets with further resistance because the inlet pipe 17, is located, as shown in Figure 2, in advance (in the direction of motion) of the outlet pipe 20 leading to the driving nozzle 24 of the rotor 1, as shown in Figure 1; this lead of the inlet over the outlet causes a portion of the live steam to be driven by the blades 26 of rotor 1' into making almost a complete circuit of the casing 18' between the inlet 17 and the outlet 20, while such portion of the steam as may seek to pass directly from inlet 17 to outlet 20 must make the passage in a direction directly opposed to the motion of the rotor blades 26.

Both the inlet 17 and the outlet 20 may be otherwise located than as shown and there may be a plurality of each suitably spaced alternately around the casings to avoid unbalancing effects on the rotors—without departing from the principle of the invention, the drawing merely illustrating the principle involved, and different types of rotors will vary in their requirements.

The rotor 1' thus meets several forces which retard it and prevent it from attaining the same velocity as the rotor 1, these forces being the surface friction of the high-density steam, the work done by the blades in forcing part of the steam to take the longer route around the casing 18' between inlet and outlet, and the friction of the blades in opposing the direct passage of part of the steam from the inlet to the outlet.

Rotor 1' being thus retarded, the shaft 2, through reaction of the retarding forces and the direct pull of rotor 1, will be set in motion with its connected load and since the rotors are connected through equal gearing to the shaft, through the spider and its pinions, the shaft must rotate at a rate equal to one-half the difference between the velocities of the oppositely moving rotors, or:

$$(1) \quad V_s \text{ equals} \frac{V-v}{2}$$

Wherein $V_s$ denotes velocity of the shaft, $V$ the velocity of the faster running or steam-driven rotor and $v$ that of the retarded or gear-driven rotor.

At equal speeds the shaft will not rotate, its speed then being zero as previously noted. But when the retarding forces either begin to slow down the gear-driven rotor, or prevent its gaining velocity as the steam-driven rotor gains velocity, a turning moment is exerted on the shaft 2 because as shown above the shaft must rotate at one-half of any difference of velocity developed between the rotors. By construction, therefore, its difference of velocity with respect to one rotor is algebraically equal to its differences of velocity with respect to the other rotor, or:

$$(2) \quad V - V_s \text{ equals } v + V_s.$$

The less the difference of velocity effected between the rotors, the slower the shaft will rotate and the greater the turning moment or torque acting upon it for any particular speed of the driving rotor; obviously since the greater the ratio of driving rotor speed to shaft speed, the greater the power ratio, which varies directly with the relative speed between driver and driven as with any other speed reducing mechanism. Or again, the longer it takes to effect the difference after turning on steam because of the size of the connected load, the greater the torque becomes because of the rapid rise of power ratio as the rotor speed increases.

Thus when rotor 1 in attaining speed reaches say, 100 revolutions per minute driving the rotor 1' through dense steam at perhaps, 98, the shaft will be rotating at 1 revolution per minute or one-half the difference of 2 revolutions between the rotors, with power ratio of 100:1. But if the inertia of the load were sufficiently great, the rotor 1 might attain full speed, say 10,000 revolutions per minute, before the rotor 1' were retarded enough to start the load into motion at 1 revolution per minute, the power ratio at the instant having risen by then to 10,000:1.

It is evident from the foregoing that shaft 2 must begin to rotate simultaneously as a difference develops between the rotor velocities regardless of what these velocities may actually be at any particular instant although its velocity will only be half of such difference and its acceleration half that of the difference developing. These actions are inherent in the design of the mechanism.

In the first of above cases, the algebraic difference of velocity between either rotor and the shaft was 99 and in the second case, 9999, the rotor 1' having been retarded to 98 and to 9998 revolutions per minute respectively, or substituting in Formula (2) above for each:

100 − 1 equals 98 + 1 and
  10,000 − 1 equals 9998 + 1.

If the difference between the velocities of the rotors rose to 200 or to 2,000, the shaft would rotate at 100 or 1,000, or one-half of any other difference between them, regardless of how high the normal running speed of the driving rotor might be. It is desirable to design the rotors for the highest possible speed consistent with safety not only because of higher operating efficiency and greater power for a given weight but in order that the difference of velocity between the rotors required for a given maximum shaft speed may be but a small percentage of the rotor speed, or that a wide variation of low speed might require but a very small percentage variation in the high speed, a variation in fact, which might be within usual governing limits for constant speed, the turbine being inherently a constant speed motor. Thus, with rotor 1 running at 10,000 revolutions per minute, a variation of but 5% or 500 revolutions per minute in the velocity of rotor 1′ would vary the speed of the shaft smoothly between zero and 250 revolutions per minute, whereas if the driving rotor speed were but 4,000 revolutions per minute, the same 500 revolutions variation of driven rotor speed would be 12½%.

Since the construction of the mechanism is entirely symmetrical, the action is identical for reverse motion of shaft 2, with steam driving the rotor 1′ and the rotor 1 being retarded.

The difference between the rotors may consist also, partly of retardation of one rotor and partly of acceleration of the other. Thus the rotor 1 might be accelerated 2% or to 10,200 revolutions per minute and rotor 1′ retarded 3% or to 9700 revolutions per minute giving a difference of 500 revolutions per minute between the rotors with shaft 2 driven at one half the difference, or 250 revolutions per minute, forward as before. Whether the difference effected consists entirely of retardation or partly of acceleration and the exact amount of each or of both is unimportant where the low speed is a small percentage of the high, as in the above case.

The retarding high-pressure steam filling casing 18′, of rotor 1′ is prevented from escaping by way of the driving nozzle 27, of rotor 1′ and steam chest 28 into pipe 29 and through the pipe 30 into the casing 18 of rotor 1, by check valves 32 and 33 in steam chest 28, closing by pressure of the steam.

With 5-way valve 15 in position shown, all of the steam used passes through casing 18′ of the rotor 1′ before reaching driving nozzle 24, effecting thus the maximum retardation of rotor 1′ and hence the greatest speed of shaft 2.

To vary the speed of shaft 2 below this maximum, handle 34 of the 5-way valve is moved up so that a portion of the steam may bypass through opening 35 and pipe 36 direct to driving nozzle 24, of rotor 1, and through check valve 23 which it opens, and steam chest 22—a corresponding amount being shut off from casing 18′ of rotor 1′ through the pipe 17 by the more or less complete closing of opening 16 of the 5-way valve 15 as its handle 34 was moved upward. Any portion may be thus bypassed, varying the speed of the shaft correspondingly.

The position of the 5-way valve to the extreme left position so that all of the steam goes direct to the rotor 1 with none to casing 18′ of rotor 1′, until rotor 1 attains full speed, is the better for starting a heavy load because of the enormous power ratio, as rotor 1′ is then decelerated from full reverse speed by gradually moving the valve to the right to admit the high-pressure steam to casing 18′.

For reversing the shaft 2 the 5-way valve is turned by moving handle 34 down, enough to the right to shut steam off from casing 18′, through pipe 17, thus cutting it off also from the driving nozzle 24 of rotor 1 through outlet pipe 20 leading from casing 18′, or any which might be bypassing through opening 35 and pipe 36 to nozzle 24. The dotted arrows show the path of the steam for reversing.

The valve 15 being moved thus to the right, and opening the port 35, high-pressure steam will be admitted directly into the casing 18 of the rotor 1 by way of the pipe 37, the exhaust valve 19 being moved by the handle 19′ to open the exhaust from casing 18′ and to close the exhaust from the casing 18. The high pressure steam filling casing 18, nozzle 24 and steam chest 22, closes check valves 21 and 23, and passes through outlet pipe 30, by the check valve 33 which it opens and to steam chest 28, thence to driving nozzle 27 in which it expands and gaining velocity, impinges on blades 26 and speeds up rotor 1′, the dense steam previously filling its casing 18′ escaping when exhaust valve 19 is opened. Meanwhile, the dense steam now filling and flowing through casing 18 to the driving nozzle 27 of the rotor 1′, through the pipe 30—is retarding or slowing up rotor 1 quickly while rotor 1′ speeds up. The deceleration of rotor 1 and simultaneous acceleration of rotor 1′ first exert a powerful braking action on shaft 2 to bring it to a stop at the instant the velocities of the motors become equal, then reverse its motion an instant later as the velocity of the rotor 1′ becomes faster.

Or the action may be made more gradual by moving the 5-way valve further to the right so that a portion or all of the steam may bypass through the opening 16 and the pipe 29 direct to driving nozzle 27, the check valve 32 opening to admit the steam to steam chest 28.

It is to be noted that where full low speed is but a small percentage of high, that from full speed forwardly of shaft 2 to full speed reverse, rotor 1 need be decelerated but a few percent and rotor 1′ accelerated but a few percent from their previous velocities; also that varying the high speed a few percent causes high percentage variations in the low speed.

It is evident that the greatest difference of speed between the rotors for any given opening of throttle 14, is effected when all of the steam flows through the casing of one rotor en route to the driving nozzle of the other with none being bypassed to the nozzle direct.

Since this is the greatest difference of speed between the rotors one-half of it represents the greatest speed of shaft 2 for any given opening of throttle. Conversely, the smaller the difference, the lower the speed of shaft 2 and the greater the power ratio, more of the steam then being bypassed directly to the driving rotor and less admitted to the casing of the driven or retarded rotor.

It will now be evident that there is no fixed ratio of reduction between the driving rotor and the shaft in this differential method of speed reduction. Therefore the velocity of the rotors may be very high, since only their difference of speed determines the velocity of the low-speed shaft.

While stress has been laid on securing variable low speed of the power shaft in either direction by variable low speed of the power shaft in either direction by varying the position of the 5-way valve to vary the admission of steam to the high-speed unidirectional driving and retarding rotors, the driving rotor running at constant speed—this differential speed reduction is also applicable to drive machinery requiring constant low speed either always in one direction or alternately forward and backward. The condition of constant low speed in one direction is met by setting the handle of the 5-way valve at a point to give the required low speed in the required direction.

At this point, steam will be admitted in constant amount in the path or paths necessary to effect a constant difference of speed between the rotors, this difference being double the required constant low speed.

And for the condition requiring also alternate or occasional, constant low speed in reverse direction, the 5-way valve handle need only be moved to an opposite point where the rotors will reverse in function and acquire the required difference in speed. It is evident that this latter point may be such that the constant low reverse speed may be faster or slower than the constant low forward speed.

It should be noted that there is no reversal of motion of the rotors nor of the gears 8 nor of the pinions 9 for reversing shaft 2, the steam connections only being switched—rotor 1 always rotating forwardly and rotor 1' backwardly for either forward or reverse motion of shaft 2, the faster running rotor being driven by high-velocity steam and governing the direction of motion of shaft 2, also driving the other rotor through high-density steam so that its motion is retarded, this slower running rotor governing the speed of shaft 2.

The work done on one rotor to retard it as it is driven through the high-density steam by the other rotor is recovered as heat and utilized in the steam as it leaves the casing, giving regeneration of the energy thus expended.

With any type of rotor used, the basic principle is the same—the shaft is driven because the forces retarding one rotor react in the same direction as the impelling force on the other rotor. Where greater power is required than can be obtained from a single rotor, it is apparent that additional units may be arranged along a lengthened shaft without departing from the principle of the invention.

What I claim is:—

1. A steam turbine having integral gearing, and having oppositely rotating high-speed rotors, a power shaft, said gearing interconnecting said rotors and shaft, and means for effecting a difference of speed between the rotors whereby said shaft is driven through said gearing, differentially at low speed.

2. A differential steam turbine having integral gearing adapted to convert high, constant speed into low, variable speed, and having oppositely rotating rotor elements, a power shaft connected differentially with said rotor elements through said gearing, and means for effecting differences of velocity between said elements whereby they are caused to drive said shaft at variable low speed.

3. A differential steam turbine adapted to convert high, constant, unidirectional speed into low, variable speed in forward and reverse directions, consisting of oppositely rotating rotor elements, a power shaft, gearing connecting said elements differentially to said power shaft, steam connections, and means for varying and reversing said connections to effect differences of velocity between said elements in varying degrees whereby they drive said shaft differentially at variable low speed in forward or reverse direction without changing the direction of rotation of said elements.

4. A differential steam turbine adapted to convert high, constant speed into low, constant speed in forward and reverse directions, consisting of oppositely rotating rotor elements, a power shaft, differential gearing connecting said elements with said shaft, steam connections for applying steam to said elements, means for varying and reversing said connections to force said elements to rotate at different speeds, whereby they drive said shaft at any desired low speed in forward or reverse direction.

5. A steam turbine consisting of forward-running and backward-running rotor elements, separate casings and driving nozzles for said elements, means for applying the motive fluid to said elements in variable ratios, a central shaft around which said rotor elements are adapted to rotate freely at high speed, gearing between said elements connecting them symmetrically and differentially to said shaft whereby one rotor element when actuated by steam may drive the other rotor element through the gearing to impart motion to said shaft when a difference is effected between the velocities of said elements, at a speed equal to one-half said difference and in the direction of the faster running or steam-driven element.

6. In a differential turbine having rotor elements adapted to rotate oppositely, means for applying fluid to an element to drive the same, a power shaft, means for effecting a difference of velocity between the oppositely rotating rotor elements including differential gearing whereby the fluid driven element imparts motion to the other element through said differential gearing connecting said elements to the power shaft and also including means for supplying a dense atmosphere to the gear driven element which acts as a gaseous brake to retard its motion.

7. In a steam turbine, means for converting high speed into low speed comprising a shaft, oppositely rotating high-speed rotors, differential gearing connecting said rotors to said shaft, and means for effecting a difference of speed between the rotors whereby the power shaft is driven differentially at a lower speed.

8. In a steam turbine, means for converting high, constant speed into low, variable speed, comprising a shaft, oppositely rotating high-speed rotors, differential gearing connecting said rotors to said shaft, and means for effecting a difference of speed between the rotors and for varying same whereby the power shaft is driven differentially at any desired lower speed.

9. In a steam turbine, means for converting high, constant, unidirectional speed, into low, variable, reversible speed, comprising a power shaft, a differential gearing, oppositely rotating high-speed rotors symmetrically connected through said differential gearing to said power shaft, means for effecting a difference of speed between the rotors and for varying same whereby the power shaft is driven differentially at any desired lower speed, and means for reversing the direction of rotation of the power shaft and for varying its reverse speed as desired without reversing the direction of rotation of the high-speed rotors.

10. A steam turbine including oppositely rotating high-speed rotors, separate casings therefor having separate motive fluid nozzles, a central shaft around which said rotors are adapted to rotate concentrically, a differential gearing symmetrically connecting said shaft and said rotors whereby either rotor when driven by a motive fluid expanded through its nozzles will drive the other rotor in the opposite direction through the differential gearing, symmetrical motive fluid connections to said casings and nozzles equipped with suitable valves and cocks forming means for applying any portion of the motive fluid to the rotors as a retarding or driving force, as desired.

11. In a differential turbine having a power transmitting element, rotor elements loosely mounted with respect to the power transmitting element, gearing operatively connecting said rotor elements and connected to the power transmitting element and effective to transmit rotation from one rotor element to the other rotor element in a reverse direction; means for applying a motive fluid to one of the rotor elements to drive the same and for applying a fluid to the other rotor element to retard the rotation thereof, said means including a valve and motive fluid conduits controlled by said valve and leading from a source of fluid pressure, said means being adapted to apply the motive fluid at high velocity and low pressure to the fluid driven rotor element, and to apply high pressure, high density fluid to the gear driven rotor element, to retard the rotation thereof, whereby rotation is imparted to said power transmitting element in the direction of rotation of the fluid driven rotor element.

12. In a differential turbine having a power transmitting element, rotor elements loosely mounted with respect to the power transmitting element, gearing operatively connecting said rotor elements and connected to the power transmitting element and effective to transmit rotation from one rotor element to the other rotor element in a reverse direction; a source of fluid pressure, means for applying a motive fluid to one of the rotor elements to drive the same and for applying a fluid to the other rotor element to retard the rotation thereof, said means including a valve and motive fluid conduits controlled by said valve and leading from said source of fluid pressure, said means being adapted to apply the motive fluid at high velocity and low pressure to the fluid driven rotor element, and to apply high pressure, high density fluid to the gear driven rotor element, to retard the rotation thereof, whereby rotation is imparted to said power transmitting element in the direction of rotation of the fluid driven rotor element, said means being arranged to permit the alternate application of motive fluid and retarding fluid, respectively, to the rotor elements to effect the rotation of the power transmitting element alternatively in either direction.

13. In a differential turbine, a power shaft, rotor casings, rotors loosely mounted on the shaft and enclosed by the respective casings, differential gearing connected to the shaft and including gears fixed to the respective rotors, means for applying motive fluid to one of said rotors to drive the same in one direction, said gearing being effective to drive the other rotor in the other direction, said means including a valve controlled inlet conduit leading from a source of fluid pressure and entering the casing of the gear driven rotor, and an outlet conduit leading out from said casing of said gear driven rotor behind the inlet conduit referred to in the direction of rotation of the gear driven rotor, said outlet conduit entering the casing of the fluid driven rotor and being effective to apply to motor fluid to drive said last mentioned rotor.

14. In a differential turbine, a power shaft, rotor casings, rotors loosely mounted on the shaft and enclosed by the respective casings, differential gearing connected to the shaft and including gears fixed to the respective rotors, means for applying motive fluid to one of said rotors to drive the same in one direction, said gearing being effective to drive the other rotor in the other direction, said means including a valve controlled inlet conduit leading from a source of fluid pressure and entering the casing of the gear driven rotor, and an outlet conduit leading out from said casing of said gear driven rotor, behind the inlet conduit, in the direction of rotation of the gear driven rotor, said outlet conduit entering the casing of the fluid driven rotor and being effective to drive said last mentioned rotor, said casings having exhaust ports and a valve for alternatively opening and closing said ports.

15. In a differential turbine, a power shaft, rotors loosely mounted on said shaft, gearing attached to said shaft and including also gears fixed to the respective rotors, through which one rotor may be driven from the other, casings enclosing the respective rotors, fluid pressure conduits, through which active motive fluid may be delivered directly to one of said rotors to rotate the same, and through which retarding fluid may be delivered directly into the casing of the other rotor, and through which motive fluid may be bypassed from the gear driven rotor casing to the fluid driven rotor.

16. In a differential turbine, a power shaft, rotors loosely mounted on said shaft, gearing attached to said shaft and including also gears fixed to the respective rotors, through which one rotor may be driven from the other, casings enclosing the respective rotors, fluid pressure conduits, through which active motive fluid may be delivered directly to one of said rotors to rotate the same, and through which retarding fluid may be delivered directly into the casing of the other rotor, and through which motive fluid may be bypassed from the gear driven rotor casing to the fluid driven rotor and a valve controlling the flow of fluid through the respective conduits.

17. In a differential turbine, a power shaft, rotors loosely mounted on said shaft, gearing attached to said shaft and including also gears fixed to the respective rotors, through which one rotor may be driven from the other, casings enclosing the respective rotors, fluid pressure conduits, through which active motive fluid may be delivered directly to one of said rotors to rotate the same, and through which retarding fluid may be delivered directly into the casing of the other rotor, and through which motive fluid may be bypassed from the gear driven rotor casing to the fluid driven rotor, each casing having a valve controlled outlet and a valve controlling the flow of fluid through the respective conduits.

18. In a turbine, a power delivery shaft, rotor elements loosely mounted thereon, casings enclosing said rotors, gearing between said rotors and said shaft, means for applying active motive fluid to one of said rotors, to drive the same, said fluid driven rotor being operable to drive the other rotor through said gearing, means for bypassing part of said motive fluid into the casing of the gear driven rotor, to retard the rotation of said rotor, said by-passing means including inlet and outlet pipes connected into the casing of the gear driven rotor, the inlet being arranged in advance of the outlet with respect to the direction of rotation of the gear driven rotor, whereby a portion of the retarding fluid in the gear driven rotor casing will be driven around said casing, by said rotor, in the direction of rotation of said rotor, to said outlet, and the remainder of said retarding fluid moving toward said outlet will travel against the rotation of the gear driven rotor, said inlet and outlet being so located axially and radially relative to the casing as to produce the required retardation of said gear driven rotor without producing unbalancing effects on said rotor, the casing of said gear driven rotor having an exhaust port and an admission port for active motive fluid, and means for closing said exhaust and admission ports while retarding fluid is being admitted to the gear driven rotor casing.

19. A differential steam turbine including rotors, a power driven shaft on which the rotors are loosely mounted, means for interconnecting said rotors and for connecting them differentially to said shaft, means for applying motive fluid to one of said rotors and retarding fluid to the other rotor, and means for varying such application so as to cause said rotors to revolve at different velocities, to effect the rotation of said shaft, and whereby the ratio of the driving rotor speed, to the shaft speed, will vary inversely as the difference between the rotor speeds varies.

20. A differential turbine including a power shaft, oppositely rotating rotors loosely mounted thereon, means for applying motive fluid to one rotor to drive the same, means for applying retarding fluid to the other rotor, operative connections between said rotors and between them and said shaft, said operative connections being so disposed that the reaction of the retardation of one rotor will operate in the same direction as the force impelling the other rotor thereby effecting the rotation of the shaft in the direction of the rotation of the motive fluid impelled rotor, at one half the difference of speed between said rotors.

21. A differential steam turbine whereby high, constant, unidirectional speed may be converted into low, variable, reversible motion, including a driving element, a similar driven element, a centrally disposed power shaft, gearing in constant mesh and through which said elements are connected to said shaft, means for applying steam to the driving element to drive the same, said gearing being effective to impart rotation from the driving element to the driven element, in the opposite direction, means for applying an atmosphere of dense steam to the gear driven element means for varying the amount of the steam applied to said driven element so that the velocity of the gear driven element will vary, said gearing being effective to rotate said shaft in the direction of the driving element when a difference is effected between the velocities of the elements, and to increase the speed of said shaft as the difference increases between the speeds of said elements, means for reversing said application of the steam so as to reverse the functions of said elements and thereupon reversing also its direction of motion with the rotors, said gearing being mounted to move in a constant direction.

22. A turbine comprising rotors arranged to rotate oppositely, a central power shaft, angle gearing interconnecting said rotors with each other so that rotation of one rotor will be imparted to the other in the opposite direction, said gearing also connecting said rotors to said shaft, a casing around each rotor, provided with an exhaust, inlets and outlets for motive fluid suitable driving nozzles associated with said rotors, an exhaust valve adapted to close the exhaust of one casing and open the exhaust of the other casing, a conical valve with outlets in variable relation to said casings and driving nozzles, conduits for conducting the motive fluid admitted to the turbine through said conical valve in variable amount to either casing and to the driving nozzles of the rotor in the other casing, with conducting conduits from either casing to the driving nozzles of the other casing, check valves for controlling the flow of fluid through said conduits, whereby the motive fluid may be admitted to either casing as desired to retard the rotor within said casing, one of said conducting conduits leading to the other casing and through which said retarding fluid may pass to the driving nozzles of the other casing, the inlets for the admission of the retarding steam to said casings being arranged in advance of the outlets, in the direction of rotation of said rotors, providing opposing paths for passage of the motive fluid from inlet to outlet to set up additional retarding forces to that due to surface friction, the reversal of movement of the motive fluid through the turbine being effective to retard the previously impelling rotor and to impel and accelerate the previously retarded rotor and thereby reversing the direction of rotation of said shaft.

23. A differential steam turbine including a central shaft, rotors disposed along said shaft and adapted to rotate at high speed in opposite directions around said shaft, differential gearing operatively connecting said rotors together and to the shaft through which the shaft is driven from the rotors at low speed when the oppositely moving rotors rotate at different speeds means for applying motive fluid, in variable amounts to some of said rotors, to drive the same, and to other of said rotors to retard the same.

In testimony whereof I have signed my name to this specification.

CHARLES F. J. CHARLISS.